US009829220B2

(12) United States Patent
Oh et al.

(10) Patent No.: US 9,829,220 B2
(45) Date of Patent: Nov. 28, 2017

(54) HEAT EXCHANGER AND METHOD OF MANUFACTURING THE SAME

(71) Applicants: Hyundai Motor Company, Seoul (KR); Halla Visteon Climate Control Corp., Daejeon (KR)

(72) Inventors: Man Ju Oh, Yongin-si (KR); Jae Woo Park, Ansan-si (KR); June Kyu Park, Hwaseong-si (KR); Jae Woong Kim, Hwaseong-si (KR); Eun Young Seo, Daejeon (KR); Yong Nam Ahn, Seoul (KR)

(73) Assignees: Hyundai Motor Company, Seoul (KR); Halla Visteon Climate Control Corp., Daejeon (KR)

( * ) Notice: Subject to any disclaimer, the term of this patent is extended or adjusted under 35 U.S.C. 154(b) by 400 days.

(21) Appl. No.: 14/326,272

(22) Filed: Jul. 8, 2014

(65) Prior Publication Data

US 2015/0176871 A1    Jun. 25, 2015

(30) Foreign Application Priority Data

Dec. 23, 2013    (KR) ........................ 10-2013-0161184

(51) Int. Cl.
*F25B 21/04* (2006.01)
*B23P 15/26* (2006.01)
(Continued)

(52) U.S. Cl.
CPC .............. *F25B 21/04* (2013.01); *B23P 15/26* (2013.01); *F28D 1/05383* (2013.01);
(Continued)

(58) Field of Classification Search
CPC ....... F25D 1/05308; F25D 7/16; F25B 25/005
See application file for complete search history.

(56) References Cited

U.S. PATENT DOCUMENTS 4,242,874 A * 1/1981 Simms .................... F25B 21/02
62/3.6
5,884,486 A * 3/1999 Hughes ................... F25B 21/02
62/279
(Continued)

FOREIGN PATENT DOCUMENTS

JP        2009-264719 A       11/2009
JP        2009264719 A    *  11/2009
(Continued)

*Primary Examiner* — Frantz Jules
*Assistant Examiner* — Brian King
(74) *Attorney, Agent, or Firm* — Morgan, Lewis & Bockius LLP

(57) ABSTRACT

Disclosed are a heat exchanger and a method of manufacturing a heat exchanger. The heat exchanger may include a plurality of three-step tubes, each having a three-layered section and each having a liquid passage at a middle portion and module insertion spaces at opposite sides of the liquid passage, a plurality of thermoelectric modules inserted into the module insertion spaces, a plurality of cooling fins coupled to an outer surface of each of the three-step tubes, and an upper tank and a lower tank coupled to an upper side and a lower side of the three-step tubes to be fluidically communicated with the liquid passages of the three-step tubes. The three-step tubes and the cooling fins may be stacked laterally with respect to each other. The three-step tubes, the cooling fins, the upper tank, and the lower tank may be brazed by a same filler material comprising a metal.

3 Claims, 4 Drawing Sheets

(51) Int. Cl.
  *F28D 1/053* (2006.01)
  *F28F 1/02* (2006.01)
(52) U.S. Cl.
  CPC ........ *F28F 1/022* (2013.01); *F25B 2321/023* (2013.01); *F28F 2255/16* (2013.01); *F28F 2275/04* (2013.01); *Y10T 29/49378* (2015.01)

(56) References Cited

U.S. PATENT DOCUMENTS

2009/0266104 A1* 10/2009 Ichiyanagi .............. F25B 39/00
  62/498
2013/0306285 A1* 11/2013 Jindou .................... F25B 39/00
  165/173

FOREIGN PATENT DOCUMENTS

| | | |
|---|---|---|
| JP | 2011-069552 A | 4/2011 |
| JP | 2013-157446 A | 8/2013 |
| KR | 1020060095431 A | 8/2006 |
| KR | 10-2010-0031015 A | 3/2010 |
| KR | 1020120005710 A | 1/2012 |

* cited by examiner

HEAT EXCHANGER AND METHOD OF MANUFACTURING THE SAME

CROSS-REFERENCE(S) TO RELATED APPLICATION

The present application claims priority of Korean Patent Application Number 10-2013-0161184 filed on Dec. 23, 2013, the entire contents of which application are incorporated herein for all purposes by this reference.

BACKGROUND OF INVENTION

Field of Invention

The present invention relates to a heat exchanger for exchanging heat between two fluids, and more particularly, to a heat exchanger for actively exchanging heat by using a thermoelectric module and a method of manufacturing the same.

Description of Related Art

In a heat exchanger using a thermoelectric module according to the related art, since pellet bonding in the thermoelectric module is performed through high-temperature soldering, the thermoelectric module is damaged if a temperature of about 200° C. or above is applied to the thermoelectric module. Thus, thermal bonding units at a periphery of the thermoelectric module, such as a pin and a tube, should be soldered at a temperature of 200° C. or below.

However, a portion bonded through low-temperature soldering acts as a thermal resistance to a path for transferring heat generated by the thermoelectric module to the outside, which is a main cause of lowering performance of the heat exchanger.

Further, since the thermoelectric module should be soldered at a temperature of 200° C. or below, a jig for fixing a periphery of the thermoelectric module and a separate bonding process are necessary.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made in an effort to solve the above-described problems and/or other problems, and the present invention is directed to providing a heat exchanger, the heat transfer performance of which can be enhanced or maximized by removing a thermal resistance on a heat transfer path, which can be manufactured through a simple manufacturing process, and damage of the thermoelectric module can be prevented in the manufacturing process since all parts forming the heat exchanger except for a space into which a thermoelectric module is inserted are bonded by a base metal, and a method of manufacturing the same.

In accordance with various aspects of the present invention, there is provided a heat exchanger including: a plurality of three-step tubes, each having a three-layered section and each having a liquid passage at a middle portion and module insertion spaces at opposite sides of the liquid passage, a plurality of thermoelectric modules inserted into the module insertion spaces, a plurality of cooling fins coupled to an outer surface of each of the three-step tubes, and an upper tank and a lower tank coupled to an upper side and a lower side of the three-step tubes to be fluidically communicated with the liquid passages of the three-step tubes in which the three-step tubes and the cooling fins are stacked laterally with respect to each other, wherein the three-step tubes, the cooling fins, the upper tank, and the lower tank are brazed by a same filler material comprising a metal.

In accordance with various other apsects of the present invention, there is provided a method of manufacturing a heat exchanger, the method including: a tube manufacturing step of producing a plurality of three-step tubes, each having a three-layered section and each having a liquid passage at a middle portion and module insertion spaces at opposite sides of the liquid passage for receiving one or more thermoelectric modules; a coupling step which includes coupling cooling fins to an outer surface of the three-step tubes such that the three-step tubes and the cooling fins are stacked laterally with respect to each other, disposing an upper tank and a lower tank at an upper side and a lower side of the three-step tubes, respectively, and brazing the three-step tubes, the cooling fins, the upper tank, and the lower tank using a same filler material comprising a metal; an opening forming step of cutting a front side and a rear side of one or each of the three-step tubes after the coupling step to form a front opening and a rear opening; a module inserting step of inserting a thermoelectric module into a module insertion space of the one or each of the three-step tubes through the front opening or the rear opening; and a front side sealing step of blocking the front opening The methods and apparatuses of the present invention have other features and advantages which will be apparent from or are set forth in more detail in the accompanying drawings, which are incorporated herein, and the following Detailed Description, which together serve to explain certain principles of the present invention

BRIEF DESCRIPTION OF THE DRAWINGS

The above and other features of the present invention will now be described in detail with reference to certain exemplary embodiments thereof illustrating the accompanying drawings which are given hereinbelow by way of illustration only, and thus are not limitative of the present invention, and wherein.

Figure 1:
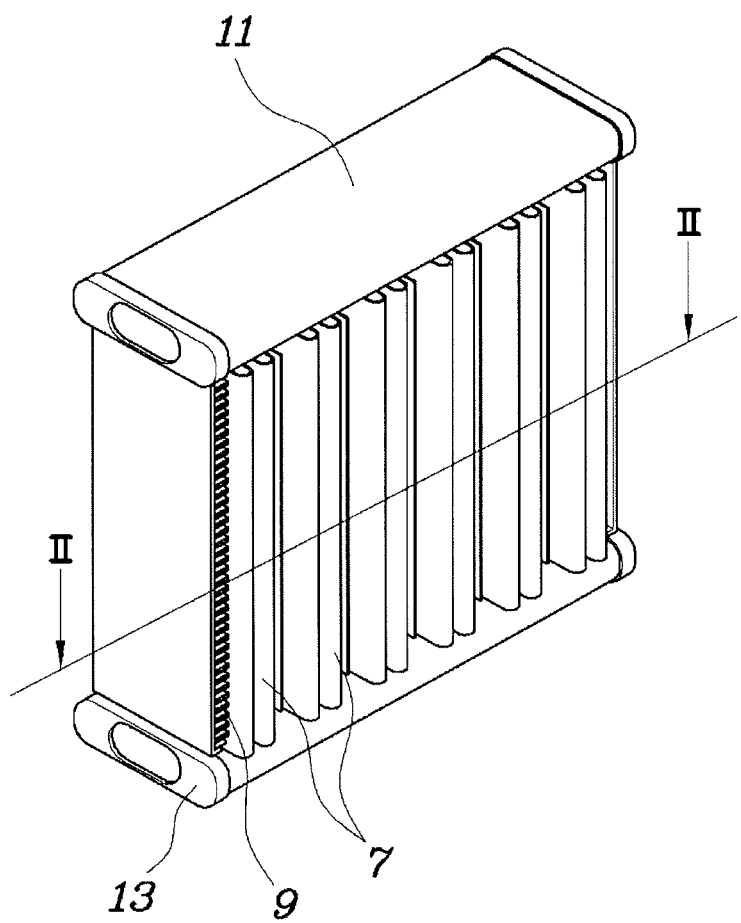
FIG. 1 is a view showing a state in which an exemplary heat exchanger according to the present invention is coupled through brazing to be manufactured.

It should be understood that the appended drawings are not necessarily to scale, presenting a somewhat simplified representation of various preferred features illustrative of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 4, a heat exchanger according to various embodiments of the present invention includes: a plurality of three-step tubes 7 each having a three-layered section, each of the three-step tubes 7 having a liquid passage 1 at a center or a middle portion thereof and module insertion spaces 5 into which a thermoelectric module 3 is to be inserted at opposite sides of the liquid passage 1; a plurality of thermoelectric modules 3 inserted into the module insertion spaces; a plurality of cooling fins 9 coupled to an outer surface of each of the three-step tubes 7; and an upper tank 11 and a lower tank 13 coupled to an upper side and a lower side of the three-step tubes 7 so as to be communicated with the liquid passages 1 of the three-step tubes in a state in which the three-step tubes 7 and the cooling fins 9 are stacked horizontally or laterally with respect to each other. The three-step tubes 7, the cooling fins 9, the upper tank 11, and the lower tank 13 are brazed by a filler metal of the same substance.

Figure 2:
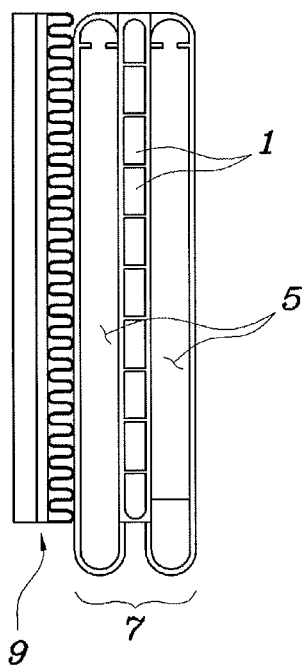
FIG. 2 is a view showing a state in which one three-step tube and cooling fins are connected to each other, when viewed from a section taken along the line II-II of FIG. 1.

That is, in the heat exchanger according to the present invention, after the three-step tubes 7 and the cooling fins 9 formed as in FIG. 2 are stacked, the upper tank 11 is disposed at an upper side of the three-step tube 7 and the lower tank 13 is disposed at a lower side of the three-step tube 7 as illustrated in FIG. 1. Thereafter, the upper tank 11 and the lower tank 13 are brazed by a filler metal of the same substance at a high temperature of 200° C. or more at once to be coupled, and the thermoelectric modules 3 are inserted into the module insertion spaces 5 of the three-step tube 7 after the brazing.

Thus, in the heat exchanger, the three-step tubes 7, the cooling fins 9, the upper tank 11, and the lower tank 13 are brazed by the same filler metal at once to be coupled while the thermoelectric modules 3 are not inserted. Accordingly, as heat is smoothly transferred between the constituent elements without generating a thermal resistance in a heat transfer path, performance of the heat exchanger is further improved. Further, since the thermoelectric module 3 is inserted after the brazing, the thermoelectric module 3 is prevented from deteriorating in the manufacturing process and a relatively simple manufacturing process is achieved.

Here, in some embodiments, the three-step tubes 7 and the cooling fins 9 are preferably formed of the same material such as aluminum, and are thermally integrated through thermal fusion to minimize thermal resistance, which is more preferable in improvement of performance of the heat exchanger.

Each of the module insertion spaces of the three-step tubes 7 are configured such that a front opening 15 and a rear opening 17 are formed by cutting a front end thereof corresponding to a direction through which air is introduced toward the cooling fins 9 and a rear end thereof corresponding to an opposite direction, the thermoelectric module 3 is inserted through the front opening 15 or the rear opening 17, and a sealing member 19 formed of an insulating material is mounted to the front opening 15 after the thermoelectric module 3 is inserted.

Figure 3:
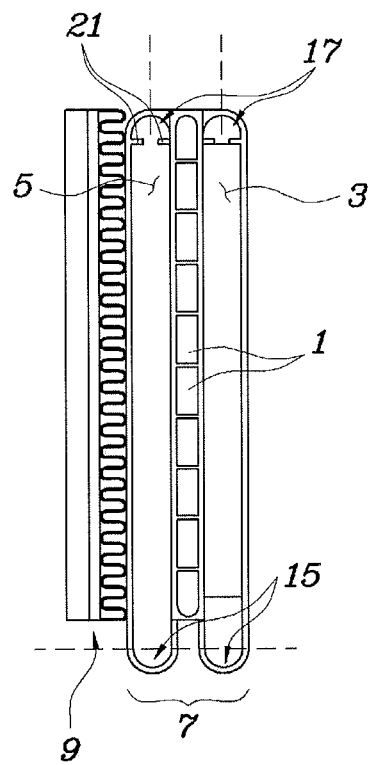
FIG. 3 is a view for explaining insertion of an exemplary thermoelectric module with reference to FIG. 2.

For illustration purposes, a cutting line for forming the front opening 15 and the rear opening 17 is indicated by a dash line in FIG. 3, and a state in which the thermoelectric module 3 is inserted into one of the module insertion spaces 5 and the thermoelectric module 3 is not inserted into the other of the module insertion spaces 5 is illustrated to be compared with each other.

The sealing member 19 surrounds the liquid passage 1 by connecting two front openings 15 on opposite sides of the liquid passage 1 of the three-step tube 7 so that the liquid passage 1 can be effectively insulated from the outside and the cooling fins 9.

The rear opening 17 is caulked to fix the thermoelectric module 3 after the thermoelectric module 3 is inserted into the module insertion space.

A stopper boss 21 for preventing the thermoelectric module 3 from deviating toward the rear opening 17 and specifying a location of the thermoelectric module 3 is integrally or monolithically formed in the module insertion space 3 of the three-step tube 7 around the rear opening 17.

Thus, when the stopper boss 21 is formed as described above, the thermoelectric module 3 is inserted through the front opening 15 and the mounting of the thermoelectric module 3 may be completed even only by blocking the front opening 15 with the sealing member 19, but caulking may be further performed.

Figure 4:
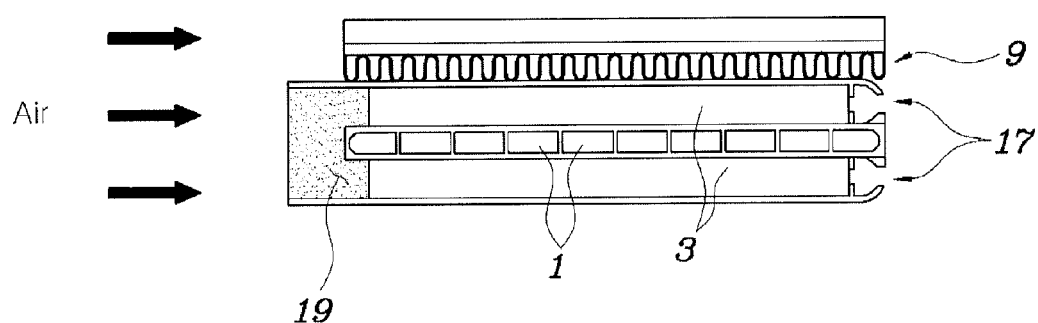
FIG. 4 is a view for explaining a sealing of an exemplary heat exchanger with reference to FIGS. 2.

Then, even if the rear opening 17 is caulked, opposite sides of the rear opening 17 do not contact each other such that a portion of the rear opening 17 is opened as shown in FIG. 4 so that transfer of heat between a heat emitting side and a cooling side of the thermoelectric module 3 can be interrupted. In some embodiments, the rear opening 17 is preferably utilized as a passage of a wire connected to the thermoelectric module 3.

Figure 5:
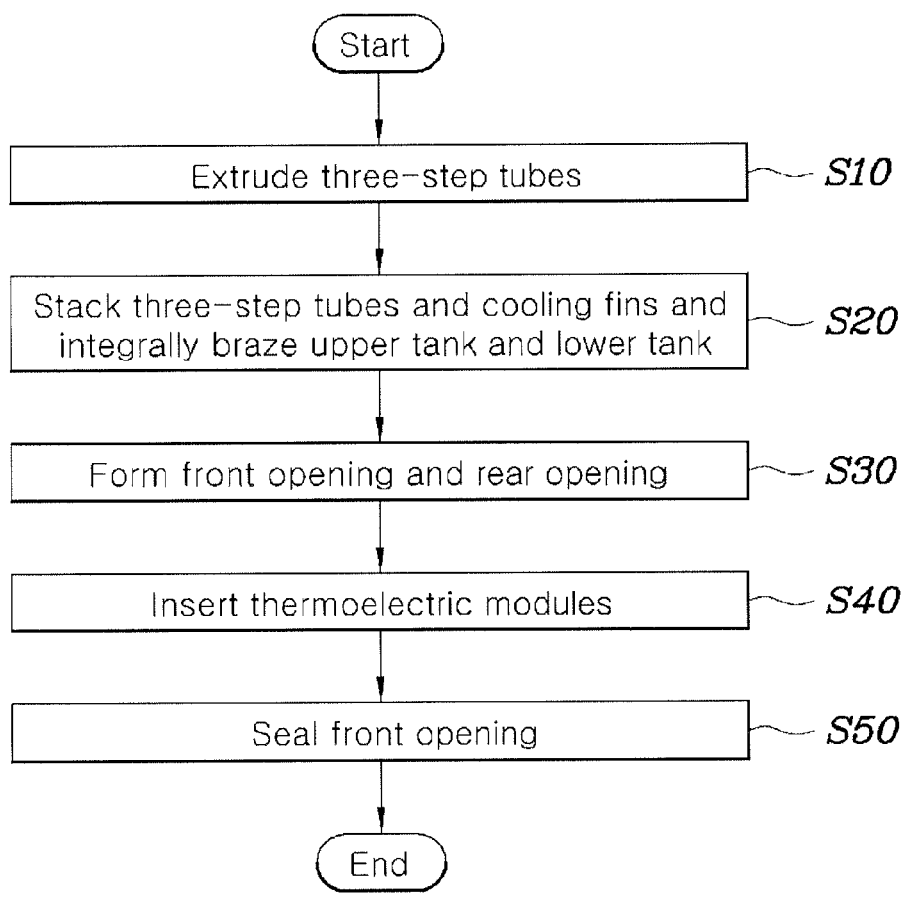
FIG. 5 is a flowchart showing an exemplary method of manufacturing a heat exchanger according to the present invention.

As exemplified in FIG. 5, a method of manufacturing a heat exchanger includes: a tube manufacturing step S10 of producing a plurality of three-step tubes 7 each having a three-layered section, each of the three-step tubes 7 having a liquid passage 1 at a center or a middle portion thereof and module insertion spaces 5 into which a thermoelectric module 3 is to be inserted at opposite sides of the liquid passage 1; a coupling step S20 of disposing an upper tank 11 and a lower tank 13 at an upper side and a lower side of the three-step tubes 7 such that the upper tank 11 and the lower tank 13 are communicated with liquid passages 1 of the three-step tubes 7 while the three-step tubes 7 and cooling fins 9 are stacked horizontally in a state in which the cooling fins 9 are coupled to an outer surface of the three-step tubes 7, and brazing the upper tank 11 and the lower tank 13 with a filler metal of the same substance at once to couple the upper tank 11 and the lower tank 13; an opening forming step S30 of cutting a front side and a rear side of the three-step tubes 7 having passed through the coupling step to form a front opening 15 and a rear opening 17; a module inserting step S40 of inserting the thermoelectric module 3 through the front opening 15 or the rear opening 17; and a front side sealing step S50 of blocking the front opening 15.

In the tube manufacturing step S10, in some embodiments, it is preferable that the three-step tubes 7 are extruded to have a predetermined sectional shape in which the liquid passage 1 and the module insertion spaces 5 form three layers.

In the module inserting step S40, in some embodiments, it is preferable that a thermoelectric module 3 is coated with a thermally conductive material and is inserted into the thermoelectric module for heat transfer between the thermoelectric module 3 and the module insertion space 5, and the thermally conductive material may be thermally conductive grease or thermally conductive bond.

In the front side sealing step S50, a sealing member 19 surrounds the liquid passage 1 by connecting two front openings 15 on opposite sides of the liquid passage 1 of the three-step tube 7.

The rear opening 17 is caulked after the thermoelectric module 3 is inserted into the rear opening 17 to prevent the thermoelectric module 3 from deviating.

In the heat exchanger configured and manufactured as described above, since all the three-step tubes 7, the cooling fins 9, the upper tank 11, and the lower tank 13 are coupled at once through brazing, the heat exchanger can be manufactured conveniently. Further, since a thermally resistant portion does not exist in the heat exchanger, a thermal conductivity can be improved. Furthermore, a deformed portion can be reduced during the brazing, and the three-step tubes 7 can be restrained and prevented from being deformed when the thermoelectric module 3 is deformed.

According to the present invention, a heat transfer performance of the heat exchanger can be maximized by removing a thermal resistance on a heat transfer path, the heat exchanger can be manufactured through a simple manufacturing process, and damage of the thermoelectric module can be prevented in the manufacturing process since all parts forming the heat exchanger except for a space into which a thermoelectric module is inserted are bonded by a base metal.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat exchanger comprising:
   a plurality of three-step tubes, each having a three-layered section and each having a liquid passage at a middle portion and module insertion spaces at opposite sides of the liquid passage;
   a plurality of thermoelectric modules inserted into the module insertion spaces;
   a plurality of cooling fins coupled to an outer surface of each of the three-step tubes; and
   an upper tank and a lower tank coupled to an upper side and a lower side of the three-step tubes to be fluidically communicated with the liquid passages of the three-step tubes in which the three-step tubes and the cooling fins are stacked laterally with respect to each other,
   wherein the three-step tubes, the cooling fins, the upper tank, and the lower tank are brazed by a same filler material comprising a metal,
   wherein each of the module insertion spaces of the three-step tubes are configured such that a front opening and a rear opening are formed by cutting a front end of the each of the module insertion spaces corresponding to a direction through which air is introduced toward the cooling fins and a rear end of the each of the module insertion spaces corresponding to an opposite direction to the direction, the thermoelectric modules are inserted through the front opening or the rear opening, and a sealing member formed of an insulating material is mounted to the front opening after the thermoelectric modules are inserted, and
   wherein the rear opening is caulked to fix the thermoelectric modules after thermoelectric modules are inserted into the module insertion spaces, and opposite sides of the rear opening are configured, after caulked, not to contact each other so that transfer of heat between a heat emitting side and a cooling side of the thermoelectric modules is interrupted, and the rear opening is configured as a passage of a wire connected to the thermoelectric modules.

2. The heat exchanger of claim 1, wherein the sealing member surrounds the liquid passage by connecting two front openings on opposite sides of the liquid passage of the three-step tube.

3. The heat exchanger of claim 1, wherein a stopper boss for preventing the thermoelectric modules from deviating toward the rear opening and specifying a location of the thermoelectric modules is integrally formed in the module insertion spaces of the three-step tube adjacent the rear opening.

* * * * *